July 11, 1933.                    E. J. LEE                    1,918,113
                         DEVICE FOR HEATING WATER
                         Filed June 23, 1932            2 Sheets-Sheet 1

WITNESS:

INVENTOR
E. J. Lee,
BY
ATTORNEY

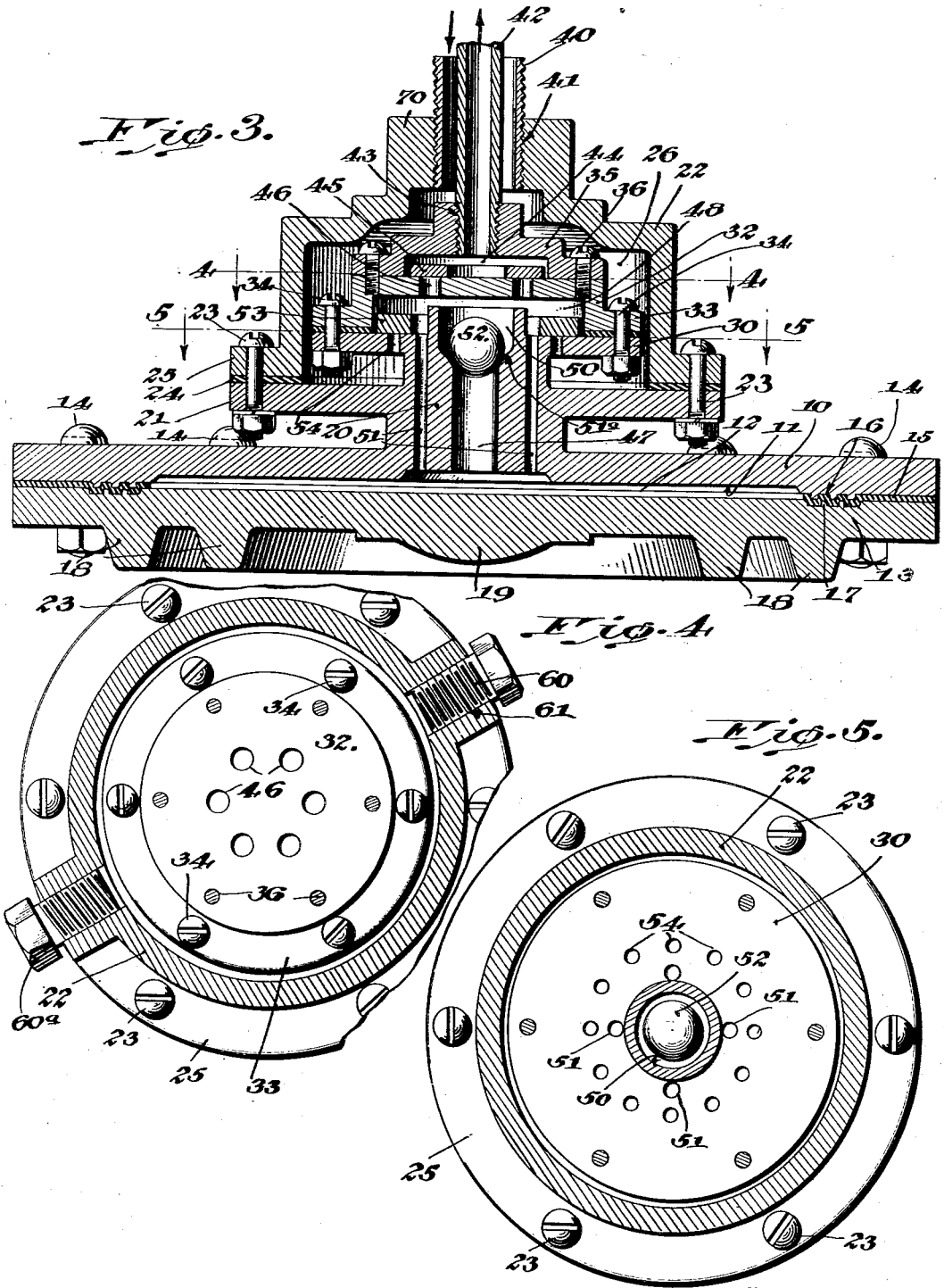

Patented July 11, 1933

1,918,113

UNITED STATES PATENT OFFICE

ELMER JESSE LEE, OF BANGOR, PENNSYLVANIA

DEVICE FOR HEATING WATER

Application filed June 23, 1932. Serial No. 618,983.

This invention relates to a device for heating water.

An object of the invention is the provision of a device which is adapted to be connected to the circulatory system of a steam boiler, a hot water boiler, or a hot water tank in which the water is heated in a chamber of comparatively large diameter, but of extremely restricted depth so that the circulation is increased and the water is more rapidly heated.

Another object of the invention is the provision of a water heating device in which a housing is provided with an enlarged heating chamber of relatively small depth, an inlet chamber being formed in the housing between the wall of the housing and an inner casing which is in communication with the heating chamber and a discharge pipe, the inlet chamber being in communication with the heating chamber and with an inlet pipe connected with the circulatory system of the hot water boiler of any design.

A further object of the invention is the provision of a heating device for water in which an outer shell or housing is provided with a disk connected by a boss to a base plate. A heating disk is secured to the base plate and spaced a limited distance from the base plate to provide a water heating chamber, the boss being provided with a central passage which is adapted to be placed in communication with a discharge pipe by valve controlled passages, a housing having an inlet chamber in communication with the heating chamber by valve controlled passages located exteriorly of the passage in the boss, a check valve being located within the central passage of the boss for preventing the discharge water from being returned to the heating chamber.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

Fig. 3 is a transverse vertical section of the heating device;

Fig. 4 is a horizontal section taken along the line 4—4 of Fig. 3; and

Fig. 5 is a horizontal section taken along the line 5—5 of Fig. 4.

Figure 1:
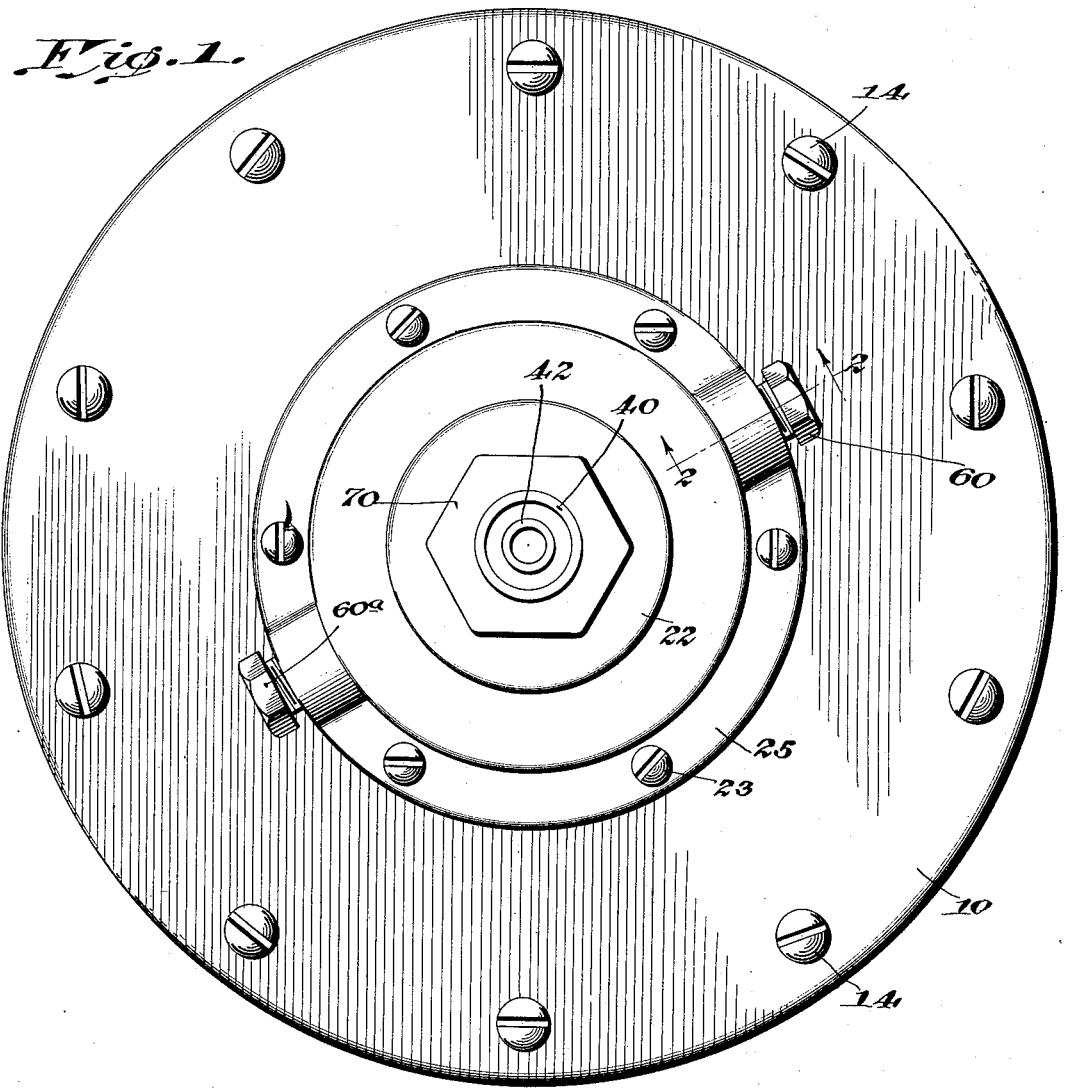
Figure 1 is a top plan view of a water heating device constructed according to the principles of my invention.
Figure 2:
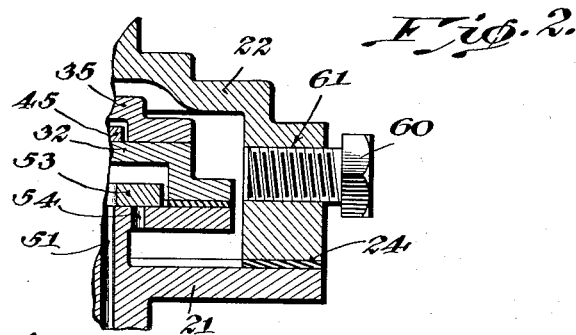
Figure 2 is a fragmentary section taken along the line 2—2 of Fig. 1.

Referring now particularly to the drawings 10 designates a base plate which is circular and has its inner face cut away as shown at 11 to provide a heating chamber 12 of extremely restricted depth. In other words this heating chamber is so constructed as to provide for a thin flat sheet of water between the base plate 10 and a heating plate 13. This heating plate is secured to the base plate by means of bolts 14.

An annular gasket 15 is located between the peripheral portions of the base plate 10 and the heating plate 13. Annular grooves 16 and cooperating ribs 17 give an irregular face to the gasket 15 at the inner periphery thereof and provide for a better seal between the secured plates 10 and 13.

The inner face of the heating plate 13 which is turned towards the flame is provided with annular ribs 18 and a central enlargement 19 for the purpose of radiating heat to the water in the chamber 12. This plate is formed of cast iron or brass.

A boss 20 is formed centrally and integrally with the base plate 10. A disk 21 is formed integrally with the boss and is spaced from the base plate 10 but is of considerably less diameter than the base plate. A cup-shaped member 22 is secured by means of bolts 23 to the disk 21 and a gasket 24 is located between the peripheral portions of the disk 21 and a flange 25 which projects laterally from the inner end of the cup-shaped member 22. This cup-shaped member together with the disk 21 forms a housing in which an inlet chamber 26 is located.

A second disk 30 of less diameter than the disk 21 is also formed integrally with the outer end of the boss 20 and is confined within the housing 22 in spaced relation with the disk 21.

A cup-shaped member 32 is inverted and has a lateral flange 33 secured by means of bolts 34 to the disk 30. The cap 35 is secured at 36 to the top of the cup-shaped member 32. The auxiliary disk 30, the cup-shaped member 32 and the cap 35 forms an inner casing within the housing 22.

An inlet pipe 40 for water is threaded at 41 into the outer end of the housing 22, is in communication with the inlet chamber 26 and embraces an outlet pipe 42 in concentric relation with said pipe.

The outlet or discharge pipe 42 is threaded at 43 into the cap 35 and is in communication with a chamber 44 formed between the inner face of the cap 35 and the top of the cup-shaped member 32. A valve 45 in the form of a ring rests upon the top of the cup-shaped member 32 and normally closes passages 46 formed in the top of the cup-shaped member 32.

The boss 20 is provided with a central passage 47 which places the chamber 12 in communication with a chamber 48 located between the inner face of the top of the cup-shaped member 32 and the upper face of the disk 30. The upper end of the passage, shown at 50, is enlarged and provided with a seat 51ª to receive a ball check valve 52 which normally prevents the discharge water from the pipe 42 from passing backward into the heating chamber 12 and permits the water which has been heated to flow through the passage 47 and through the discharge pipe 42 after the water has passed through the passages 46 and opened the check valve 45.

The boss 20 is also provided with a series of vertical passages 51 which connect the heating chamber 12 with the chamber 48. The passages 51 embrace the axial passage 47 in the boss 20.

Passages 54 are formed in the disk 30 for placing the inlet chamber 36 in communication with the chamber 32 and likewise the vertically disposed passages 51. A check valve 53 in the form of a ring is supported by the disk 30 and normally closes the passages 54. This check valve will permit the water to flow from the inlet chamber 26 to the chamber 48 and thence through the vertically disposed passages 51 in the boss 20 into the heating chamber 12.

A soft plug 60 is threaded into a passage 61 in the side wall of the housing 22 which may be blown out by too great a pressure in the heating device. It will be appreciated that a soft plug of the type shown at 60 is usually placed within the inner wall of the boiler of either a steam or hot water plant for substantially the same purpose as the plug 60 is employed. This plug being located centrally of the furnace may be removed and the pipe 40 is threaded into the opening for placing the heating chamber 12 in communication with the circulatory system of the heating plant.

The operation of my device is as follows: The pipe 40 is connected with that portion of the furnace through which the cold water flows and which forms a return line of the heating plant. A pipe 42 is connected with a pipe or part of the circulatory system through which the hottest portion of the water is moving.

The cold water enters the pipe 40, passes through the inlet chamber 26 and upwardly through the passage 54 thereby elevating the check valve 53. This water then flows downwardly through the passages 51 and into the heating chamber. The water having been heated rapidly, it is discharged to the axial passage 47, past the valve 52 and into the chamber 48. This water then escapes through the passages 46 thereby elevating the valve 45 whence the water will pass through the discharge pipe 42.

A second plug 60ª is carried by the member 22 at a point which is diametrically opposite the plug 60 and is adapted to be removed so that a pipe in communication with a water supply may be connected with the boss from which the plug has been removed. This change is only made when the device is employed externally of a furnace for heating water in a tank by means of gas or oil. This type of construction may also be used with hot air furnaces for heating water.

The bolt 14 and gasket 15 may be omitted and the plates 10 and 13 may be welded together.

I claim:

1. A water heater comprising a heating plate, a base plate secured to the heating plate and having a dished portion on its inner face to provide a water heating chamber of restricted depth, a boss projecting centrally from the base plate, a disk formed integrally with the boss and spaced from the base plate, a cup-shaped member having the inner end provided with an annular flange secured to the disk to form an inlet chamber for the liquid, the boss being provided with longitudinal passages connecting the inlet chamber with the heating chamber, a valve for controlling the inflow of water to the heating chamber, a pipe connecting the inlet chamber with a source of water to be heated, an auxiliary chamber within the inlet chamber, a discharge pipe connected with the auxiliary chamber, the boss being provided with a passage connecting the auxiliary chamber with the heating chamber, and a check valve controlling the last mentioned passage.

2. A water heater comprising a housing, a water heating chamber extending from the housing and of a diameter which is considerably greater than the width of the housing, the heating chamber being of small depth so that a relatively thin sheet of water is exposed to the heat, the housing being provided with an inlet passage for conducting cold water to the heater and a discharge passage for conducting heated water from the heating chamber, means for supplying the first passage with cold water, means for discharging the heated water from the second passage, valves for controlling the flow of water in the passages in one direction, the inlet passage and the discharge passage having restricted communication with each other to permit a small quantity of the cold water to pass out with the heated water.

3. A water heater comprising a housing, a water heating chamber extending from the housing and of a diameter which is considerably greater than the width of the housing, the heating chamber being of small depth so that a relatively thin sheet of water is exposed to the heat, the housing having an inlet passage for cold water leading to the heating chamber and a discharge passage for hot water from the heating chamber, the inlet and discharge passages being in restricted communication with each other, a valve adjacent the restricted communication for preventing the return of water to the inlet passage, means for supplying the inlet pipe with cold water.

ELMER JESSE LEE.